United States Patent Office 3,028,263
Patented Apr. 3, 1962

3,028,263
METHOD OF FINISHING NORMALLY IMPERVIOUS PLASTICS AND ARTICLES PRODUCED THEREBY
Charles J. Norton, Denver, Colo., assignor to The Ohio Oil Company, Findlay, Ohio, a corporation of Ohio
No Drawing. Filed Apr. 14, 1960, Ser. No. 22,117
9 Claims. (Cl. 117—138.8)

This invention relates to methods of providing a uniform, tough, durable finish on the surface of normally impervious plastics and to articles produced thereby.

Many synthetic plastics after once being formed are highly resistant to hot and cold solvents, acids and alkalies, and further resist attempts to color them or provide a finish on the surface of articles made of the plastics. One such highly useful plastic is polytetrafluoroethylene (Teflon made by Du Pont) and has almost unrivaled resistance to solvents, acids and alkalies even at such elevated temperatures of 300° C. or more.

According to the present invention I have discovered a useful and practical method to provide a tough, self-lubricating ebony-black finish on normally impervious plastics. This invention involves heating a plastic member in a hydrocarbon solvent in the presence of a Friedel-Crafts catalyst which produces a highly durable, tough, self-lubricating finish on the surface of the plastic.

Included among the objects and advantages of the present invention is the provision of a method of impregnating normally impervious plastics with a uniform, tough, self-lubricating finish on the exposed surfaces of such plastics. The invention provides, furthermore, a dye for polytetrafluoroethylene plastics (common designation for polymers derived from fluorinated ethylene monomers) essentially without change in shape or dimensions of the parts being coated.

These and other objects and advantages may be readily ascertained by referring to the following description and examples which are not intended to limit the spirit or scope of the invention to the precise details, but are intended merely as illustrative of the method of the invention.

Example I

A round-bottom, three-necked, 500 ml. flask was charged with about 200 ml. of dried, filtered light catalytic cycle oil containing approximately 60% aromatics. Note that the light catalytic cycle oil is a petroleum derived hydrocarbon, and the aromatics extend from benzene and substituted monocyclics through polycyclic and substituted polycyclic aromatics. The flask is equipped with a condenser and a piece of polytetrafluoroethylene is attached to a stirring rod or glass shaft and arranged to stir the fluid mixture in the flask. This mixture is heated to about 195° C. with vigorous stirring. At this temperature about 60 grams of anhydrous aluminum chloride was added to the reaction mixture. The temperature of the reaction mixture is increased to 200° C. for about one-half hour. The mixture was then cooled, decomposed and the apparatus disassembled and washed. The blade of polytetrafluoroethylene appeared to be uniformly impregnated with a tough, uniform black-ebony finish. The ebony finished polytetrafluoroethylene part was washed in hot aqueous detergent, hot aromatic solvents at 200° C. and various other organic solvents. It was, further, vigorously rubbed with no apparent damage. It, thus, showed good resistance to rubbing and abrasion. The finish showed remarkable resistance to the hot aqueous detergent, the aromatic solvents and the various organic solvents. The finish is waxy and self-lubricating. A section cut through the polytetrafluoroethylene part reveals a nearly uniform thickness of the ebony finish of approximately 0.1 mm. deep.

Example II

Following the procedure of Example I, a flask is charged with about 200 ml. of the light catalytic cycle oil and heated to about 195° C., after adding the 60 grams of anhydrous aluminum chloride the mixture was heated at 200° C. for approximately two hours. After cooling and decomposing the reaction mixture, the washed and dried polytetrafluoroethylene again showed a similar tough, uniform ebony-black finish. The finish again shows resistance and insolubility to hot aqueous detergent, aromatic and other organic solvents, and it is highly resistant to rubbing and abrasion.

The reaction for coating the plastics should be performed in a hydrocarbon solution containing preferably between 5–50% by weight of aromatics, and a Friedel-Crafts catalyst in the range of from .5 to 50% by weight. Preferably the catalyst is present in from 2 to 20% by weight of the solvent. The reaction is carried out at a temperature range of 100 to 500° C. and preferably at 150–300° C. To provide pressure sufficient for the temperature range, pressures should be between 0.1 and 10 atmospheres. It is preferable to have the reaction time extend from 0.1 to 10 hours, and a highly satisfactory coating can be provided in a half to two hours.

The method of the invention provides a highly useful means of impregnating fabricated plastic parts with a tough, uniform and self-lubricated finish. Such parts as gaskets, valves, tubing and other mechanical or construction parts may be so coated for finishing the exposed surfaces of such plastics. The plastic articles are uniformly coated with the black finish on all surfaces subject to the action of reaction mixture.

The examples above show the formation of a black coating on the plastic parts which is the result of a strong reaction under the influence of a strong catalyst. The depth of the coating, as well as the color, may be controlled by using milder reaction conditions, i.e., lower temperatures, shorter times, different catalyst, less catalyst, etc. Such finishes may range from tans through ebony blacks, with a variation in the penetration. The conditions may be changed by using such catalysts as aluminum chloride, ferric chloride, stannic chloride, boron trifluoride, zinc chloride, etc. With some modifications, other catalysts give Friedel-Crafts type reactions, e.g. hydrofluoric acid, sulfuric acid, phosphorus pentoxide, phosphoric acid, etc. (here listed on a decreasing potency basis).

Having thus fully set forth and described the invention, what is claimed and desired to be obtained by United States Letters Patent is:

1. The method of finishing fabricated normally impervious, fluorinated ethylene polymer plastic parts which comprises heating such a plastic part submerged in a hydrocarbon solvent containing from 5–50% by weight of aromatics and in the presence of a Friedel-Crafts catalyst in a range from ½ to 50% by weight of the solvent.

2. The method of claim 1 in which the heating is performed in a temperature range of from 100–500° C.

3. The method of finishing fabricated normally impervious, fluorinated ethylene polymer plastic parts which comprises heating such a plastic part submerged in a light catalytic cycle oil solvent containing from 5–50% by weight of aromatics in the presence of a Friedel-Crafts catalyst in a range from 2–20% by weight.

4. The method of claim 3 in which the Friedel-Crafts catalyst is anhydrous aluminum chloride.

5. A method of providing a uniform, tough, resistant finish on a normally impervious polytetrafluoroethylene which comprises heating a pre-fabricated part of such a polytetrafluoroethylene submerged in a hydrocarbon solvent containing from 5–50% by weight of aromatics in the presence of from .5–50% by weight of a Friedel-Crafts catalyst at a temperature of from 100–500° C.

6. A method according to claim 5 in which the catalyst is anhydrous aluminum chloride.

7. A method according to claim 5 in which the prefabricated part is heated for at least about one-half hour in the reaction mixture.

8. A new article of manufacture comprising a prefabricated normally impervious, fluorinated ethylene polymer plastic article having a tough, durable finish on its exposed surfaces, which finish is produced by heating the article submerged in a hydrocarbon solvent containing a substantial amount of aromatics and a Friedel-Crafts catalyst.

9. A method of finishing prefabricated normally impervious fluoroethylene polymer articles which comprises heating a prefabricated part of such a fluoroethylene polymer submerged in a hydrocarbon solvent containing from 5–50% by weight of aromatics and in the presence of a Friedel-Crafts catalyst in a range from one-half to 50% by weight of the solvent.

No references cited.